(12) United States Patent
Ley

(10) Patent No.: US 7,421,822 B1
(45) Date of Patent: Sep. 9, 2008

(54) STABILIZING SUPPORT FOR AN ANIMAL TRAP

(76) Inventor: Brent Vander Ley, 270 E. 249th St., Chamberlain, SD (US) 57325

( * ) Notice: Subject to any disclaimer, the term of this patent is extended or adjusted under 35 U.S.C. 154(b) by 416 days.

(21) Appl. No.: 11/124,996

(22) Filed: May 9, 2005

(51) Int. Cl.
*A01M 23/24* (2006.01)
(52) U.S. Cl. .............................. 43/96; 43/88
(58) Field of Classification Search ............... 43/88, 43/90, 91, 96; 248/220.21, 229.1, 302, 309.1, 248/310, 146, 158, 121, 97, 127
See application file for complete search history.

(56) References Cited

U.S. PATENT DOCUMENTS

| | | | | |
|---|---|---|---|---|
| 447,686 A * | 3/1891 | Holladay | .................... | 248/97 |
| 495,728 A * | 4/1893 | Elliott | .................... | 248/97 |
| 504,787 A * | 9/1893 | Kountz | .................... | 248/97 |
| 514,481 A * | 2/1894 | Matier | .................... | 248/97 |
| 917,820 A * | 4/1909 | West | .................... | 248/97 |
| 957,652 A * | 5/1910 | Bush | .................... | 248/97 |
| 959,659 A * | 5/1910 | Walter | .................... | 43/96 |
| 1,375,286 A * | 4/1921 | Gibbs | .................... | 43/96 |
| 1,405,846 A * | 2/1922 | Iverson | .................... | 248/97 |
| 1,409,924 A * | 3/1922 | Byrne | .................... | 43/96 |
| 1,441,666 A * | 1/1923 | Dinkel | .................... | 248/97 |
| 1,457,246 A * | 5/1923 | Hause | .................... | 248/97 |
| 1,467,082 A * | 9/1923 | Baldwin | .................... | 248/127 |
| 1,551,242 A * | 8/1925 | Dick | .................... | 248/146 |
| 1,858,713 A * | 5/1932 | Martin | .................... | 43/96 |
| 2,363,699 A * | 11/1944 | Smith | .................... | 248/97 |
| 2,388,539 A * | 11/1945 | Hartman | .................... | 43/96 |
| 2,455,017 A * | 11/1948 | McCormick | ............... | 248/146 |
| 2,470,977 A * | 5/1949 | Chidsey, Jr. | .................... | 248/97 |
| 2,499,303 A * | 2/1950 | Ensign | .................... | 43/96 |
| 2,574,563 A * | 11/1951 | Hieb | .................... | 248/97 |
| 2,787,310 A * | 4/1957 | Zerbe | .................... | 248/97 |
| 2,947,107 A * | 8/1960 | Lehn | .................... | 43/92 |
| 3,010,245 A * | 11/1961 | Conibear | .................... | 43/90 |
| 3,226,070 A * | 12/1965 | Kurlander | .................... | 248/97 |
| 3,461,600 A * | 8/1969 | Boudreau | .................... | 43/96 |
| 3,502,291 A * | 3/1970 | Ackerman et al. | ............ | 248/97 |
| 3,595,507 A * | 7/1971 | Kurlander | .................... | 248/97 |
| 3,655,157 A * | 4/1972 | Dalton | .................... | 248/97 |
| 3,659,816 A * | 5/1972 | Wilson | .................... | 248/97 |
| 3,747,259 A * | 7/1973 | Pellowski | .................... | 43/96 |
| 3,750,990 A * | 8/1973 | Jacobs | .................... | 248/146 |
| 3,826,455 A * | 7/1974 | O'Donnell | .................... | 248/97 |
| 3,974,592 A * | 8/1976 | Staats | .................... | 43/96 |
| 3,991,509 A * | 11/1976 | Frost | .................... | 43/90 |
| 4,020,585 A * | 5/1977 | Benschoter | .................... | 43/96 |
| 4,152,861 A * | 5/1979 | Miller | .................... | 43/96 |
| 4,267,660 A * | 5/1981 | Kielhorn | .................... | 43/96 |

(Continued)

*Primary Examiner*—Darren W Ark
(74) *Attorney, Agent, or Firm*—Jeffrey A. Proehl; Woods, Fuller, Shultz & Smith, PC

(57) ABSTRACT

A stabilizing support system for a body-gripping trap is disclosed. The stabilizing support system comprises a trap-engaging apparatus for removably engaging a body-gripping trap, and the trap-engaging apparatus comprises a pair of jaw engaging members for engaging opposite jaws of a trap. Each of the jaw engaging members comprises an upper portion and a lower portion, with the upper portion comprising a pair of laterally-spaced arms and a bridge joining the pair of arms, and the lower portion comprising a pair of laterally spaced legs. The apparatus also includes connectors for connecting the pair of jaw engaging members together in an opposed orientation.

1 Claim, 4 Drawing Sheets

U.S. PATENT DOCUMENTS

| | | | | |
|---|---|---|---|---|
| 4,318,520 A | * | 3/1982 | Walker | 248/97 |
| 4,354,543 A | * | 10/1982 | Bogner | 248/147 |
| 4,411,091 A | * | 10/1983 | Hedstrom et al. | 43/96 |
| 4,458,394 A | * | 7/1984 | Schultz | 43/96 |
| 4,467,989 A | * | 8/1984 | Stroh | 248/97 |
| 4,492,056 A | * | 1/1985 | Reasland | 43/96 |
| 4,499,685 A | * | 2/1985 | Sibley | 43/96 |
| 4,502,242 A | * | 3/1985 | Scherrinsky | 43/96 |
| 4,517,762 A | * | 5/1985 | Venetz | 43/96 |
| 4,613,104 A | * | 9/1986 | Garrott | 248/97 |
| D286,741 S | * | 11/1986 | Clauss | 43/96 |
| 4,667,912 A | * | 5/1987 | DeVilbiss | 248/97 |
| 4,692,050 A | * | 9/1987 | Kaufman | 248/97 |
| 4,720,934 A | * | 1/1988 | Gompers | 43/96 |
| 4,723,741 A | * | 2/1988 | Doering | 248/97 |
| 4,823,504 A | * | 4/1989 | Ronning | 43/96 |
| 4,893,769 A | * | 1/1990 | Rotelli | 248/97 |
| 4,915,329 A | * | 4/1990 | Doninger | 248/98 |
| 4,921,193 A | * | 5/1990 | Benesch | 248/97 |
| 4,953,815 A | * | 9/1990 | Beymer et al. | 248/97 |
| 5,169,101 A | * | 12/1992 | Wenzel et al. | 248/97 |
| 5,213,291 A | * | 5/1993 | Wiebe | 248/97 |
| 5,263,672 A | * | 11/1993 | He | 248/97 |
| 5,427,340 A | * | 6/1995 | Stromsmoe et al. | 248/97 |
| 5,775,649 A | * | 7/1998 | O'Leary | 248/97 |
| D418,653 S | * | 1/2000 | Kent, Jr. | D34/6 |
| 6,334,593 B2 | * | 1/2002 | Inoue | 248/99 |
| 6,574,912 B1 | * | 6/2003 | Johnson | 43/96 |
| 7,036,451 B1 | * | 5/2006 | Hutchinson | 248/231.71 |
| 7,318,569 B1 | * | 1/2008 | Bilotta | 248/97 |
| 2002/0104932 A1 | * | 8/2002 | Johnston | 248/97 |
| 2004/0123511 A1 | * | 7/2004 | Beauregard | 43/88 |

* cited by examiner

STABILIZING SUPPORT FOR AN ANIMAL TRAP

BACKGROUND OF THE INVENTION

1. Field of the Invention

The present invention relates to animal trap holders and more particularly pertains to a new stabilizing support for an animal trap that is easily configured to adapt to different trap sizes and to different mounting conditions.

2. Description of the Prior Art

The use of animal trap holders is generally known in the prior art. However, the known trap holder have tended to be heavy, which limits the supports on which the holders can be mounted as well as limits the orientations in which the holders may be mounted (such as suspending). The known trap holders have also tended to be bulky, which limits the places the locations in which the holder can be positioned. The known trap holders also tend to be limited to a particular size of trap and not well suited for use on other sizes of traps, which causes the user to need to keep a number of different trap holders is the user is using a number of different trap sizes. Further, many of the known trap holders permit some degree of rotation by the trap that is being held, which can allow the animal to rotate the trap out of its path rather than passing through the trap. Also, the known trap holders tend to be difficult to adjust or modify in the field to different mounting conditions or surfaces, which also limits the places that the trap being held may be located. The inability to modify the trap holder is due in part to the rigidity of materials employed for many of the known trap holders.

In these respects, the stabilizing support for an animal trap according to the present invention substantially departs from the conventional concepts and designs of the prior art, and in so doing provides an apparatus primarily developed to be easily configured to adapt to different trap sizes and to different mounting conditions.

SUMMARY OF THE INVENTION

In view of the foregoing disadvantages inherent in the known types of animal trap holders now present in the prior art, the present invention provides a new stabilizing support for an animal trap wherein the same can be utilized for different trap sizes and different mounting conditions.

To attain this, the present invention generally comprises a stabilizing support system for a body-gripping trap. The body gripping trap may be of the type having a pair of oppositely oriented jaws connected together, with each of the jaws including a pair of upper and lower jaw portions pivotally connected together, to permit pivot movement of the upper and lower jaw portions away from each other to set the trap, and to permit pivot movement of the upper and lower jaw portions toward when the trap is sprung. The stabilizing support system comprises a trap-engaging apparatus for removably engaging a body-gripping trap. The trap-engaging apparatus comprises a pair of jaw engaging members for engaging opposite jaws of a trap. Each of the jaw engaging members comprises an upper portion and a lower portion, with the upper portion comprising a pair of laterally-spaced arms and a bridge joining the pair of arms, and the lower portion comprising a pair of laterally spaced legs. Connectors connect the pair of jaw engaging members together in an opposed orientation.

Optionally, the stabilizing support system includes a mount for mounting the trap-engaging apparatus on a surface, and the mount is removably mountable on the trap-engaging apparatus.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

One significant advantage of the present invention is the adaptable nature of the apparatus, which can be easily configured to adapt to mounting on different supports and in different orientations.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

Figure 1:
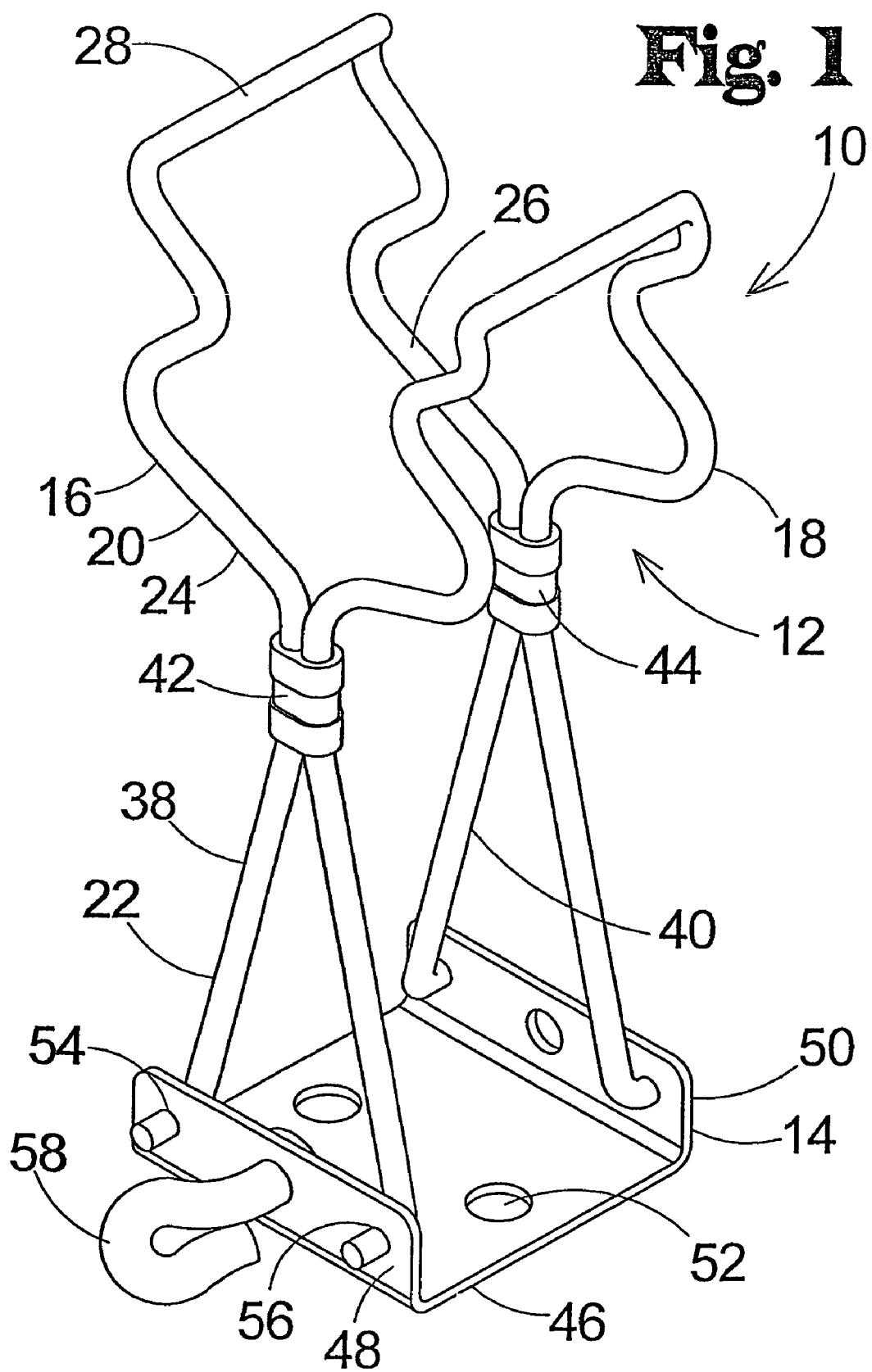
FIG. 1 is a schematic perspective view of a new stabilizing support system for an animal trap according to the present invention.
Figure 2:
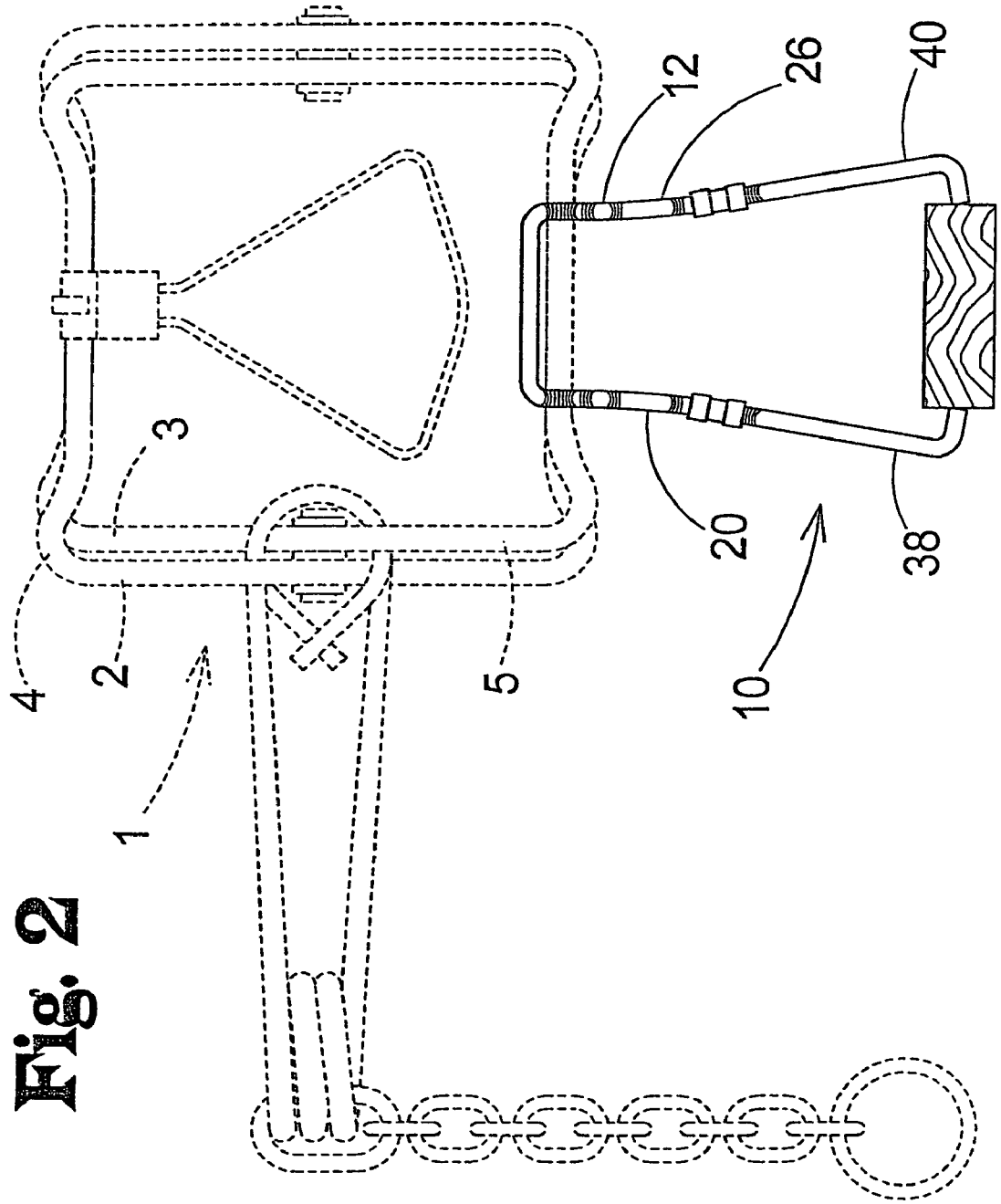
FIG. 2 is a schematic side view of the present invention engaging a body-gripping trap.
Figure 3:
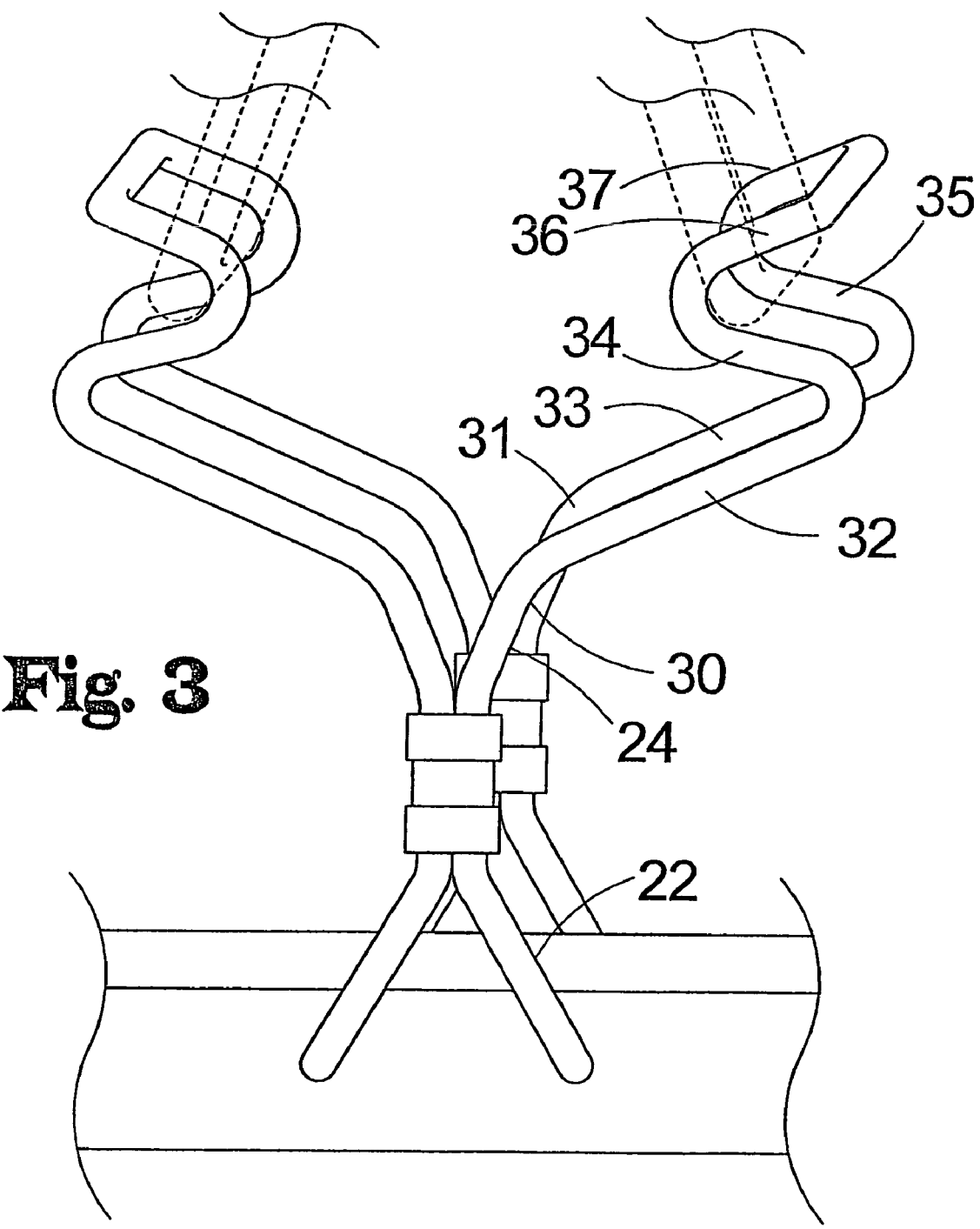
FIG. 3 is a schematic end view of the present invention engaging a body-gripping trap.
Figure 4:
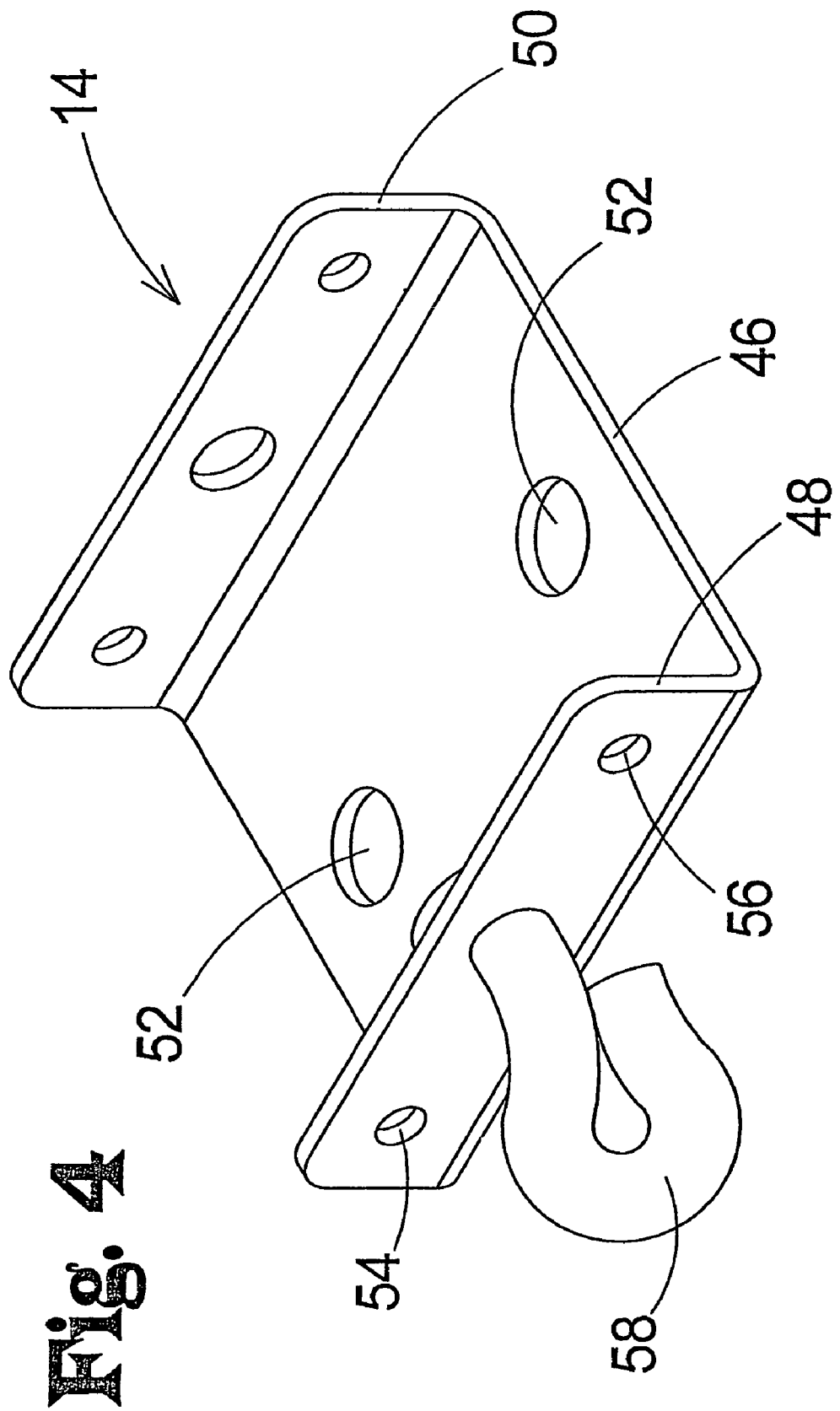
FIG. 4 is a schematic perspective view of the mount of the present invention.

With reference now to the drawings, and in particular to FIGS. 1 through 4 thereof, a new stabilizing support system for an animal trap, embodying the principles and concepts of the present invention and generally designated by the reference numeral 10, will be described.

As best illustrated in FIGS. 1 through 4, the stabilizing support system 10 of the invention is highly suitable for mounting or otherwise supporting an animal trap 1, such as a body-gripping trap, on a surface or a support. The stabilizing support system 10 may generally comprise a trap-engaging apparatus 12 for engaging the trap 2, which may be mounted on a surface or other support, and may also include a mount 14 for mounting the trap-engaging apparatus 12 to a surface or other support.

A body gripping trap 1 suitable for use with the invention may have a pair of oppositely oriented jaws 2, 3 connected together, and each of the jaws 2, 3 may include a pair of upper 4 and lower 5 jaw portions. The upper 4 and lower 5 jaw portions are pivotally connected together to permit pivot movement of the upper and lower jaw portions away from each other to set the trap, and permit pivot movement of the upper and lower jaw portions toward when the trap 1 is sprung.

The trap-engaging apparatus 12 removably engages the body-gripping trap so that the trap may be easily mounted on and removed from the apparatus. The trap-engaging apparatus comprises a pair of jaw engaging members 16, 18 for engaging opposite jaws 2, 3 of a trap 1. The pair of jaw-engaging members 16, 18 is preferably resiliently flexible in nature to permit movement of the members to mount the trap on the members. The jaw engaging members 16, 18 preferably have a substantially similar shape, and are oriented in an opposed or mirrored configuration.

The jaw engaging members 16, 18 may have a generally U-shaped configuration, and each of the jaw engaging members may comprise an upper portion 20 and a lower portion 22. The upper portion 20 of each jaw engaging member includes a pair of arms 24, 26 and a bridge 28 joining the pair of arms. Each of the arms 24, 26 comprises a pair of first diverging sections 30, 31, a pair of second diverging sections 32, 33, a pair of first converging sections 34, 35, and a pair of third diverging sections 36, 37.

The lower portion 22 of the jaw engaging members comprise a pair of laterally spaced legs 38, 40, and the legs of one 16 of the jaw engaging members diverges from the legs of the other 18 of the jaw engaging members.

Each of the jaw engaging members 16, 18 may comprise a formed elongate member, preferably a flexible wire that is bendable but exhibits a degree of resilience or resistance to bending, and the wire tends to hold its shape. The flexible wire is bendable upon application of sufficient hand force to overcome the resiliency, and can therefore be configured by the user if desired.

The trap engaging apparatus 12 may also include means for connecting the pair of jaw engaging members 16, 18 together in an opposed orientation, such as a pair of connectors 42, 44. The connectors 42, 44 may be positioned substantially between the upper 20 and lower 22 portions of the jaw engaging members 16, 18. Illustratively, the connectors 16, 18 may comprise a pair of ferrules that clamp the pair of jaw engaging members 16, 18 together at two locations. The pair of jaw engaging members 16, 18 converge at the connectors 42, 44, and the upper portions 20 of the jaw engaging members diverge away from the connectors. The bendable nature of the jaw-engaging members 16, 18 permits the user to move the upper portions 20 of the members away from each other or toward each other to adjust the trap-engaging apparatus to the size of the trap 1 being supported.

The stabilizing support system 10 may include the mount 14 for mounting the trap-engaging apparatus 12 on a surface, and may be highly suitable for mounting the apparatus 12 on frozen ground, ice, trees, wood floors, rafters, and the like.

The mount 14 is preferably removably mountable on the trap-engaging apparatus 12, and may engage the lower portions 22 of the pair of jaw engaging members 16, 18. The mount 14 may comprise a base plate 46 and a pair of side plates 48, 50. The base plate 46 may have at least one hole 52 for receiving a fastener for fastening the base plate to a surface. The pair of side plates 48, 50 are mounted on the base plate 46, and may be spaced from each other and may be oriented substantially parallel to each other. Each of the side plates 48, 50 may have at least one hole 54 for receiving a portion of the pair of jaw engaging members 16, 18, and preferably each of the side plates includes a pair of holes 54, 56 that each receive one of the legs of each of the jaw-engaging members 16, 18.

The mount 14 may also include a loop 58 for attaching the mount to a lanyard that may be employed to hold the mount to a feature such as an anchor in the ground or a branch, for example. The loop 58 may be mounted on one of the side plates 54, 56.

In use, the trap-engaging apparatus 12 may be obtained in a collapsed or substantially flat condition, and the upper and lower portions of the apparatus 12 may be bent away from each other so as to diverge from each other. The legs 38, 40 of the lower portions 22 of the members 16, 218 may be configured to engage a number of different types of structure, from a bent portion for resting on a surface, to being wrapped about an elongate branch. The lower jaw portions 5 of the jaws 2, 3 are positioned so that the upper portions 20 of the jaw-engaging members 16, 18 press outwardly against the lower jaw portions, with the jaw portions being situated between the first converging sections 34, 35 and the third diverging sections 36, 37. Upon tripping of the trap 1, the lower jaw portions 5 are free to move toward the upper jaw portions 4 without hindrance from the trap-engaging apparatus 12.

With respect to the above description then, it is to be realized that the optimum dimensional relationships for the parts of the invention, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A stabilizing support system for a body-gripping trap, the body gripping trap having a pair of oppositely oriented jaws connected together, each of the jaws including a pair of upper and lower jaw portions pivotally connected together to permit pivot movement of the upper and lower jaw portions away from each other to set the trap and permit pivot movement of the upper and lower jaw portions toward each other when the trap is sprung, the stabilizing support system comprising:

a trap-engaging apparatus for removably engaging a body-gripping trap, the trap-engaging apparatus comprising:
a pair of jaw engaging members for engaging opposite jaws of a trap, each of the jaw engaging members comprising:
an upper portion and a lower portion;

the upper portion comprising a pair of laterally-spaced arms and a bridge joining the pair of arms;
the lower portion comprising a pair of laterally spaced legs; and
connecting means for connecting the pair of jaw engaging members together in an opposed orientation;
wherein the pair of jaw engaging members converge at the connecting means and the upper sections of the jaw engaging members diverge away from the connecting means toward the bridge;
a mount for mounting the trap-engaging apparatus on a surface, the mount being removably mountable on the trap-engaging apparatus, the mount removably engaging the lower portions of the pair of jaw engaging members, the mount comprising a base plate and a pair of side plates mounted on the base plate, the pair of side plates being spaced and oriented substantially parallel to each other;
a loop for attaching the mount to a lanyard, the loop being mounted on the mount;
wherein the pair of jaw-engaging members are resiliently flexible;
wherein the pair of jaw engaging members have a substantially similar shape;
wherein each of the jaw engaging members has a generally U-shaped configuration;
wherein each of the arms has a portion with a substantially serpentine shape;
wherein each of the serpentine arm portions comprises a pair of first diverging sections, a pair of second diverging sections, a pair of first converging sections, and a pair of third diverging sections;
wherein the legs of one of the jaw engaging members diverges from the legs of the other of the jaw engaging members; and
wherein the connecting means is positioned substantially between the upper and lower portions of the jaw engaging members.

* * * * *